US010570831B2

(12) United States Patent
Braun et al.

(10) Patent No.: US 10,570,831 B2
(45) Date of Patent: Feb. 25, 2020

(54) METHOD FOR DETERMINING THE COMPOSITION OF THE FUEL USED TO OPERATE AN INTERNAL COMBUSTION ENGINE

(71) Applicant: Continental Automotive GmbH, Hannover (DE)

(72) Inventors: Tobias Braun, Undorf (DE); Gerhard Haft, Lappersdorf (DE); Rainer List, Regensburg (DE)

(73) Assignee: CONTINENTAL AUTOMOTIVE GMBH, Hannover (DE)

(*) Notice: Subject to any disclaimer, the term of this patent is extended or adjusted under 35 U.S.C. 154(b) by 76 days.

(21) Appl. No.: 16/064,551

(22) PCT Filed: Nov. 24, 2016

(86) PCT No.: PCT/EP2016/078736
§ 371 (c)(1),
(2) Date: Jun. 21, 2018

(87) PCT Pub. No.: WO2017/108322
PCT Pub. Date: Jun. 29, 2017

(65) Prior Publication Data
US 2018/0372008 A1    Dec. 27, 2018

(30) Foreign Application Priority Data
Dec. 21, 2015  (DE) .................. 10 2015 226 138

(51) Int. Cl.
*F02D 19/08* (2006.01)
*F02D 41/00* (2006.01)
(Continued)

(52) U.S. Cl.
CPC ......... *F02D 19/088* (2013.01); *F02D 19/084* (2013.01); *F02D 41/0025* (2013.01);
(Continued)

(58) Field of Classification Search
CPC .... F02D 19/088; F02D 41/28; F02D 41/0025; F02D 19/084; F02D 2200/101;
(Continued)

(56) References Cited

U.S. PATENT DOCUMENTS 5,020,495 A    6/1991  Plapp .......................... 123/326
5,697,346 A   12/1997  Beck ............................ 123/494
(Continued)

FOREIGN PATENT DOCUMENTS

| DE | 3711398 A1 | 10/1988 | ............. F02D 41/04 |
| DE | 10302806 A1 | 8/2004 | ............. F02D 41/38 |

(Continued)

OTHER PUBLICATIONS

Korean Notice of Allowance, Application No. 2019065739354, 3 pages, dated Sep. 10, 2019.
(Continued)

*Primary Examiner* — Joseph J Dallo
(74) *Attorney, Agent, or Firm* — Slayden Grubert Beard PLLC

(57) ABSTRACT

A method for operating an internal combustion engine may include: measuring dynamic pressure oscillations in the inlet tract at a defined operating point during normal operation; generating a corresponding pressure oscillation signal; determining a crankshaft phase angle; determining an actual phase position using the pressure oscillation signal by discrete Fourier transformation; determining a chemical composition of the fuel using the determined actual phase position and reference phase positions of the same signal frequency for different fuel compositions; and adjusting operating parameters of the internal combustion engine based on the determined chemical composition.

11 Claims, 2 Drawing Sheets

(51) Int. Cl.
*F02D 41/28* (2006.01)
*F02D 41/24* (2006.01)

(52) U.S. Cl.
CPC .......... *F02D 41/28* (2013.01); *F02D 41/2422* (2013.01); *F02D 2041/288* (2013.01); *F02D 2200/021* (2013.01); *F02D 2200/0406* (2013.01); *F02D 2200/0414* (2013.01); *F02D 2200/0612* (2013.01); *F02D 2200/101* (2013.01); *Y02T 10/36* (2013.01)

(58) Field of Classification Search
CPC ..... F02D 2200/0612; F02D 2200/0414; F02D 2200/0406; F02D 2200/021; F02D 2041/288; F02D 41/2422; Y02T 10/36
See application file for complete search history.

(56) References Cited

U.S. PATENT DOCUMENTS

| | | | | |
|---|---|---|---|---|
| 8,000,880 | B2 | 8/2011 | Shibata et al. | 701/104 |
| 8,191,412 | B2 | 6/2012 | Döring | 73/114.71 |
| 8,949,005 | B2 | 2/2015 | Ono | 701/111 |
| 9,664,605 | B2 | 5/2017 | Mikami | |
| 2006/0157037 | A1* | 7/2006 | Rosel | F02D 41/1482 123/687 |
| 2007/0185638 | A1* | 8/2007 | Odenthal | B60T 8/17555 701/70 |
| 2009/0178474 | A1 | 7/2009 | Bailey | 73/114.38 |
| 2010/0287943 | A1* | 11/2010 | McMahan | F01D 25/002 60/772 |
| 2012/0167551 | A1* | 7/2012 | Lugg | F02C 7/36 60/226.1 |
| 2015/0051847 | A1* | 2/2015 | Angello | F01D 21/003 702/35 |
| 2015/0345409 | A1 | 12/2015 | Bollinger et al. | 701/105 |
| 2017/0198649 | A1 | 7/2017 | Kainz et al. | |
| 2018/0355815 | A1* | 12/2018 | Braun | F02D 41/009 |

FOREIGN PATENT DOCUMENTS

| | | | |
|---|---|---|---|
| DE | 102007045574 A1 | 12/2008 | F02D 41/00 |
| DE | 102008025350 A1 | 12/2009 | F01N 9/00 |
| DE | 102009017207 B4 | 12/2009 | F02D 41/00 |
| DE | 102009031159 B3 | 4/2011 | G01N 27/06 |
| DE | 102010034133 A1 | 2/2012 | F02D 41/00 |
| DE | 102011077404 B4 | 12/2012 | F02D 41/00 |
| DE | 102015209665 A1 | 12/2015 | F02D 41/00 |
| DE | 102015113518 A1 | 3/2016 | F02D 19/06 |
| EP | 2581588 A1 | 4/2013 | F02D 41/00 |
| EP | 2725216 A1 | 4/2014 | F02D 35/02 |
| JP | 06123246 A | 5/1994 | F02D 41/04 |
| JP | 2012241554 A | 12/2012 | F02D 45/00 |
| JP | 2014196736 A | 10/2014 | F02D 19/06 |
| KR | 20150093701 A | 8/2015 | F02D 19/06 |
| WO | 2014/154227 A1 | 10/2014 | F02D 19/08 |
| WO | 2017/108322 A1 | 6/2017 | F02D 19/08 |

OTHER PUBLICATIONS

German Office Action, Application No. 102015226138.7, 9 pages, dated May 11, 2016.
International Search Report and Written Opinion, Application No. PCT/EP2016/078736, 21 pages, dated Mar. 10, 2017.
Japanese Office Action, Application No. 2018532392, 4 pages, dated May 20, 2019.

* cited by examiner

METHOD FOR DETERMINING THE COMPOSITION OF THE FUEL USED TO OPERATE AN INTERNAL COMBUSTION ENGINE

CROSS-REFERENCE TO RELATED APPLICATIONS

This application is a U.S. National Stage Application of International Application No. PCT/EP2016/078736 filed Nov. 24, 2016, which designates the United States of America, and claims priority to DE Patent Application No. 10 2015 226 138.7 filed Dec. 21, 2015, the contents of which are hereby incorporated by reference in their entirety.

TECHNICAL FIELD

The present disclosure relates to internal combustion engines. Various embodiments of the teachings thereof may include methods for determining the composition of the fuel used in the operation of an internal combustion engine from the intake pipe pressure signal during the operation of the internal combustion engine.

BACKGROUND

Reciprocating-piston internal combustion engines, which will in this context and hereinafter also be referred to in shortened form merely as internal combustion engines, have one or more cylinders in which a reciprocating piston is arranged. To illustrate the principle of a reciprocating-piston internal combustion engine, reference will be made below to FIG. 1, which illustrates by way of example a cylinder of an internal combustion engine, which is possibly also a multi-cylinder internal combustion engine, together with the most important functional units.

The respective reciprocating piston 6 is arranged in linearly movable fashion in the respective cylinder 2 and, together with the cylinder 2, encloses a combustion chamber 3. The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward".

The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, owing to its inertia, after it passes through a bottom dead center in the cylinder 2, to be moved "upward" again in the opposite direction as far as a top dead center. To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited (by means of an ignition plug in the case of a gasoline internal combustion engine and by ultra-ignition in the case of a diesel internal combustion engine) and burned in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder is divided into two strokes distributed over one crankshaft rotation (360°) (two-stroke engine) or into four strokes distributed over two crankshaft rotations (720°) (four-stroke engine). To date, the four-stroke engine has become established as a drive for motor vehicles. In an intake stroke, with a downward movement of the reciprocating piston 6, fuel-air mixture 21 (in the case of intake pipe injection by means of injection valve 5a, illustrated as an alternative in FIG. 1 by means of dashed lines) or else only fresh air (in the case of fuel direct injection by means of injection valve 5) is introduced from the intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5. During the following working stroke, the fuel-air mixture, for example in the case of the gasoline internal combustion engine, is ignited by means of an ignition plug 4, burns and expands, outputting work, with a downward movement of the reciprocating piston 6. Finally, in an exhaust stroke, with another upward movement of the reciprocating piston 6, the remaining exhaust gas 31 is discharged out of the combustion chamber 3 into the exhaust-gas tract 30.

The delimitation of the combustion chamber 3 with respect to the intake tract 20 or exhaust-gas tract 30 of the internal combustion engine 1 is realized generally, and in particular in the example taken as a basis here, by means of inlet valves 22 and outlet valves 32. In FIG. 1, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33, in each case by means of suitable inlet camshaft control adapters 24 and outlet camshaft control adapters 34, such as for example toothed gears, sprockets or belt pulleys, and with the aid of a control mechanism 40, which has for example a toothed gear mechanism, a control chain or a toothed control belt, are coupled, in a predefined position with respect to one another and with respect to the crankshaft 9 by means of a corresponding crankshaft control adapter 10, which is correspondingly formed as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder 43 may be formed for example as a toothed gear with a multiplicity of teeth arranged so as to be distributed equidistantly over the circumference, wherein the number of individual teeth determines the resolution of the crankshaft phase angle signal.

It is likewise additionally possible, if appropriate, for the present phase angles of the inlet camshaft 23 and of the outlet camshaft 33 to be detected continuously by means of corresponding position encoders 43 and associated camshaft position sensors 42. Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft. The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41. In an ideal internal combustion engine, it is thus possible for every particular crankshaft phase angle to be assigned a particular crankpin angle, a particular piston stroke, a particular inlet camshaft angle and thus a particular inlet valve stroke and also a particular outlet camshaft angle and thus a particular outlet camshaft stroke. That is to say, all of the stated components are, or move, in phase with the rotating crankshaft 9.

In modern internal combustion engines 1, there may be additional positioning elements provided within the mechanical coupling path between crankshaft 9 and inlet camshaft 23 and the outlet camshaft 33, for example in a manner integrated into the inlet camshaft adapter 24 and the outlet camshaft adapter 34, which positioning elements effect a desired controllable phase shift between the crankshaft 9 and inlet camshaft 23 and the outlet camshaft 33. These are known as so-called phase adjusters in so-called variable valve drives. For optimum operation of the internal combustion engine (with regard to emissions, consumption, power, running smoothness, etc.), the fresh-gas charge drawn in during the intake stroke should be known as accurately as possible, and the metered fuel quantity should be coordinated therewith as exactly as possible, in order for example to be able to ensure operation with lambda ($\lambda$)=1, that is to say with the minimum quantity of oxygen required for the complete combustion of the fuel to be metered.

The drawn-in fresh-gas charge is dependent on various factors, such as for example the structural details of the internal combustion engine, the present operating point and the present settings of different positioning devices, such as for example of a throttle flap. A typical method for determining the fresh-gas charge is to measure a so-called reference internal combustion engine in all occurring operating states (engine speed, load, actuation of all actuators, different valve strokes, actuation of flaps, actuation of the phase adjusters for inlet and outlet valve, exhaust-gas turbocharger, compressor etc.), and to store said measurement values (or derivatives thereof or model-based approaches which replicate the behavior) in corresponding characteristic maps in the engine control unit of a corresponding series-production internal combustion engine. All structurally identical, series-production internal combustion engines of the same type series are operated with this reference dataset that is generated. As a first approximation, the fresh-gas charge can thus be assumed as being known.

The associated fuel quantity to be metered, in particular to be injected, is then calculated in accordance with the predefined air/fuel ratio (A/F ratio) of the respective fuel, which is dependent on the fuel type and the fuel quality or the fuel composition. Differences thus arise depending on the fuel used. Accordingly, for example in the case of mixed fuels composed of premium gasoline and ethanol, the following air/fuel ratios are present:

| | |
|---|---|
| 100 vol % premium gasoline | 0 vol % ethanol (E0) => 14.5 |
| 75 vol % premium gasoline | 25 vol % ethanol (E25) => 13.1 |
| 50 vol % premium gasoline | 50 vol % ethanol (E50) => 11.8 |
| 25 vol % premium gasoline | 75 vol % ethanol (E75) => 10.4 |
| 0 vol % premium gasoline | 100 vol % ethanol (E100) => 9.0 |

The ethanol fraction is stated in the designation of the mixed fuel in each case in percent by volume, that is to say the mixed fuel E25 is accordingly composed of 75 vol % premium gasoline and 25 vol % ethanol.

For optimum operation of the internal combustion engine with regard to consumption, running smoothness, and emissions, it is thus also necessary for the composition of the fuel used in the respectively present operating mode to be known as accurately as possible, because otherwise erroneously metered fuel quantities may arise. Furthermore, different fuels or fuel compositions may have different characteristics, such as for example different knock resistances. For optimization of the operation, this may necessitate further adaptations, for example of the injection time or of the ignition time.

Since fuels are possibly not always available in the same quality or composition, differences may arise here from tank filling to tank filling, which differences adversely affect the operation of the internal combustion engine. For this reason, various methods and devices are already known from the prior art which have the aim of determining the fuel composition or the fuel quality.

For example, document DE 10 2009 031 159 B3 discloses a method and a device for determining a fuel quality, in particular a mixed composition of a fuel. The method is based on the determination of an electrical parameter of the fuel by means of an electric motor which has a stator and a rotor, wherein, in a gap between rotor and stator, an electrical parameter of the fuel situated therein is determined, which electrical parameter is a measure of the fuel quality.

Also known from document DE 10 2009 017 207 B4, for example, is a method for detecting the fuel quality, in which method a fuel quality value is calculated by means of a fuel quality calculation module on the basis of a torque of the engine and a change in engine speed measured over a first time period.

Furthermore, document DE 10 2011 077 404 B4 also discloses a method for determining the fuel type, which method is based on a highly precise feed of a particular differential fuel delivery quantity into a high-pressure fuel accumulator. From the corresponding pressure increase curve, a measurement value curve is determined, which is compared with comparison value curves, stored in an associated control device, for different fuel qualities. In the case of sufficient correlation of the measurement value curve with a comparison value curve, the associated fuel quality is determined.

The known methods commonly require additional sensors or, owing to environmental influences which are difficult to detect, are complicated to implement and give unsatisfactory results.

SUMMARY

The teachings of the present disclosure may provide, as far as possible without additional sensor arrangement and outlay in terms of apparatus, as exact as possible a determination of the quality or of the composition of the fuel used during presently ongoing operation, in order to be able to make corresponding adaptations to the operating parameters in order to optimize the ongoing operation.

For example, some embodiments may include methods for determining the composition of the fuel used for the normal operation of an internal combustion engine,
   wherein dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated, and wherein, at the same time, a crankshaft phase angle signal of the internal combustion engine is determined, and
   from the pressure oscillation signal, using discrete Fourier transformation, the actual phase position of a selected signal frequency of the measured pressure oscillations in relation to the crankshaft phase angle signal is determined, characterized in that,
   on the basis of the determined actual phase position, taking into consideration reference phase positions of the same signal frequency for different fuel compositions, the composition of the presently used fuel is determined.

In some embodiments, the reference phase positions are made available, as a function of the fuel composition, in reference value characteristic maps, or a model function is made available which replicates the relationship between reference phase position and fuel composition.

In some embodiments, additionally, at least one of the further operating parameters
   temperature of the intake medium in the intake tract,
   temperature of a coolant used for cooling the internal combustion engine,
   engine speed of the internal combustion engine,
is taken into consideration in the determination of the fuel composition of the fuel used.

In some embodiments, the determination of the actual phase position of the selected signal frequency and the determination of the composition of the presently used fuel are performed with the aid of an electronic processing unit assigned to the internal combustion engine, wherein the reference value characteristic maps or the model function are/is stored in at least one memory area of the electronic processing unit.

In some embodiments, the reference phase positions of the selected signal frequency have been determined in advance on a reference internal combustion engine as a function of different fuel compositions.

In some embodiments, from the reference phase positions of the selected signal frequency and the associated fuel compositions, a model function has been derived which replicates the relationship between the reference phase positions of the selected signal frequency and the fuel compositions.

In some embodiments, the determination in advance of the reference phase positions of the selected signal frequency is characterized by the measurement of a reference internal combustion engine at at least one defined operating point during intake-synchronous fuel injection, using reference fuels of different, known fuel compositions, wherein, for the determination of the reference phase positions of the selected signal frequency,
   the dynamic pressure oscillations, assignable to a cylinder of the reference internal combustion engine, in the inlet tract are measured during operation, and a corresponding pressure oscillation signal is generated, and
   wherein, at the same time, a crankshaft phase angle signal is determined, and
   the reference phase position of the selected signal frequency of the measured pressure oscillations in relation to the crankshaft phase angle signal is determined from the pressure oscillation signal by means of discrete Fourier transformation, and
   the determined reference phase angles are stored as a function of the associated fuel compositions in reference value characteristic maps.

In some embodiments, the selected signal frequencies are the intake frequency or a multiple of the intake frequency.

In some embodiments, the dynamic pressure oscillations are measured by means of a series-production-type pressure sensor in the intake pipe.

In some embodiments, the crankshaft position feedback signal is determined by means of a toothed gear and a Hall sensor.

In some embodiments, the electronic processing unit is an engine control unit for controlling the internal combustion engine, and an adaptation of further control variables or control routines for the control of the internal combustion engine is performed by the engine control unit as a function of the determined fuel composition.

BRIEF DESCRIPTION OF THE DRAWINGS

To explain the functioning of an internal combustion engine and the relationships between the fuel composition and phase position of the pressure oscillation signal measured in the intake pipe or a particular selected signal frequency, reference is made to the figures. In the figures.

DETAILED DESCRIPTION

Figure 1:
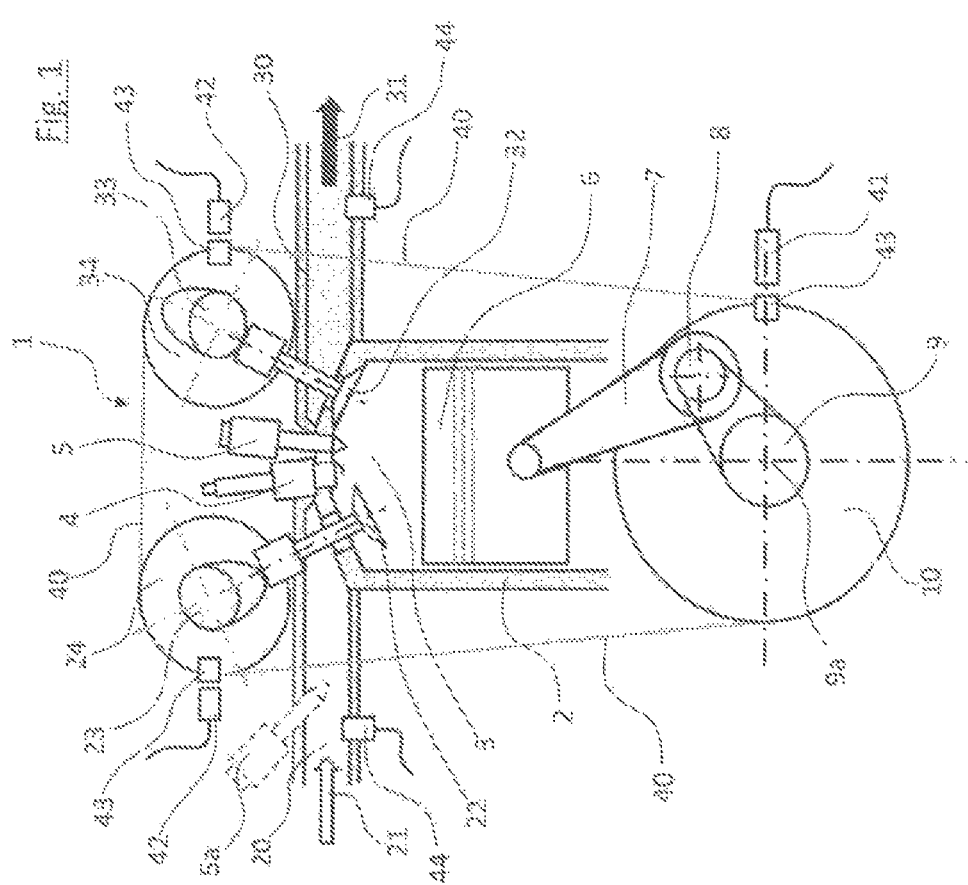
FIG. 1 is a simplified illustration of a prior art reciprocating-piston internal combustion engine, referred to in shortened form as internal combustion engine, with the most important functional components.

In some embodiments, the dynamic pressure oscillations, assignable to a cylinder of the internal combustion engine, in the inlet tract of the respective internal combustion engine are measured at a defined operating point during intake-synchronous fuel injection during normal operation, and from these, a corresponding pressure oscillation signal is generated. At the same time, a crankshaft phase angle signal of the internal combustion engine is determined, as a reference signal, as it were.

One possible operating point would for example be idle operation at a predefined rotational speed. Here, intake-synchronous injection is to be understood to mean injection in a time period during which, with the inlet valve open, fresh gas is fed into the combustion chamber. This may be realized by injection of the fuel into the intake pipe or directly into the combustion chamber of the respective cylinder with the inlet valve simultaneously open. Normal operation characterizes the intended operation of the internal combustion engine, for example in a motor vehicle, wherein the internal combustion engine is an example of a series of internal combustion engines of identical design. Further customary terms for an internal combustion engine of said type would be series internal combustion engine or field internal combustion engine.

Then, from the pressure oscillation signal, using discrete Fourier transformation, the actual phase position of a selected signal frequency of the measured pressure oscillations in relation to the crankshaft phase angle signal is determined. Subsequently, on the basis of the determined actual phase position, taking into consideration reference phase positions of the same signal frequency for different fuel compositions, the composition of the presently used fuel is then determined.

Assuming an intake-synchronous fuel injection, there is a unique relationship between the composition of the fuel used for operation and the phase position of the dynamic pressure oscillations in the inlet tract of the internal combustion engine. This relationship is observed in particular in gasoline engines, for example in conjunction with the different fractions of premium fuel and ethanol. Physical causes for this relationship are the different enthalpies of evaporation of the fuel compositions used. For example, an E0 fuel has an enthalpy of evaporation of approximately 350 kJ/kg, whereas an E100 fuel has an enthalpy of evaporation of approximately 920 kJ/kg. In the case of intake-synchronous injection, these different enthalpies of evaporation lead to different cooling of the fresh-gas charge, whereby, in turn, the density and thus the sound propagation speed in the fresh-gas charge change, and thus ultimately the propagation of the pressure waves in the intake tract, are measurably changed.

For the analysis of the pressure oscillation signal recorded in the intake tract of the internal combustion engine, said pressure oscillation signal is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position. In some embodiments, the phase position of selected signal frequencies of the pressure oscillation signal are dependent on the fuel composition used. For this purpose, it is advantageous for consideration to be given only to those signal frequencies which correspond to the intake frequency, as base frequency or 1st harmonic, of the internal combustion engine or to a multiple of the intake frequency, that is to say the 2nd to n-th harmonic, wherein the intake frequency in turn has a unique relationship with the speed of the internal combustion engine. Then, for at least one selected signal frequency, taking into consideration the crankshaft phase angle signal detected in parallel, the phase position of said selected signal frequencies is determined in relation to the crankshaft phase angle.

To determine the fuel composition from the thus determined phase angles of the selected signal frequency of the pressure oscillation signal, the determined phase position is compared with so-called reference phase positions of the same signal frequency. These reference phase positions are uniquely assigned the corresponding fuel compositions. It is thus possible, by means of the reference phase position that correlates with the determined phase position, to infer the associated fuel composition.

Figure 2:
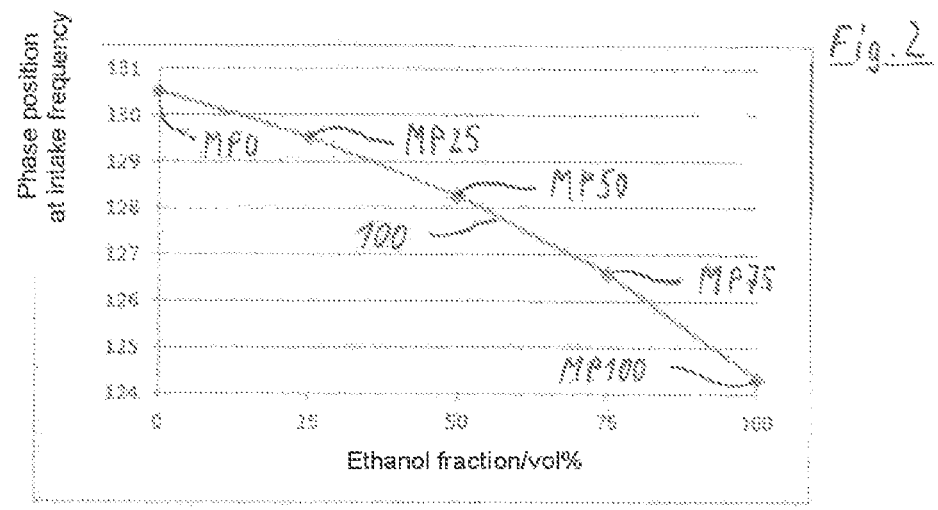
FIG. 2 shows a diagram for illustrating the dependency between the phase position of the intake frequency and the ethanol fraction of the fuel used, based on the teachings of the present disclosure.

In some embodiments, it is assumed that the relationship or the dependency of the stated variables between or on one another is uniquely known. FIG. 2 shows this relationship on the basis of the phase position of the intake frequency as a function of the ethanol fraction in the fuel. Here, a shift in the phase position of the intake frequency toward smaller values is observed with increasing ethanol fraction in the fuel. By interpolating between the individual measurement points MP0 to MP100, a continuous curve 100 with an approximately linear profile is realized.

In some embodiments, the reference phase positions may be determined in advance on a reference internal combustion engine from the series of internal combustion engines of identical design using reference fuel compositions are therefore stored as a function of the associated fuel compositions in reference characteristic maps, from which they can be accessed for comparison purposes. The simplest form of such a characteristic map is illustrated by way of example in FIG. 3 and consists in a diagram which, for a particular operating point of the internal combustion engine, replicates the dependency between the reference phase position of a particular selected signal frequency of the pressure oscillation signal, in this case the intake frequency, and the respectively associated fuel composition, in this case the ethanol fraction, in the form of a reference curve 200. A corresponding, more comprehensive characteristic map may for example include corresponding reference curves for different operating points of the internal combustion engine and different signal frequencies.

Figure 3:
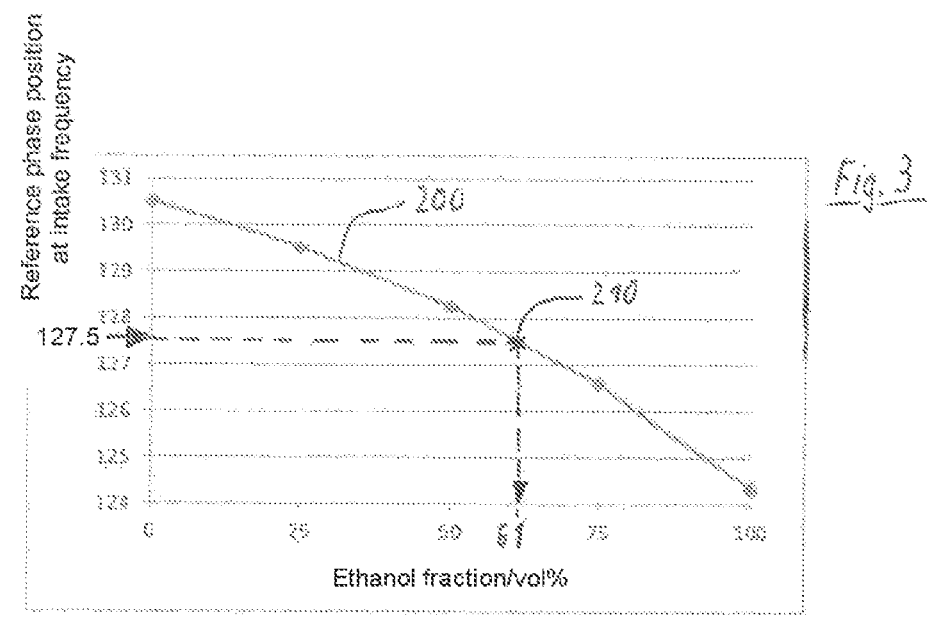
FIG. 3 shows a diagram for the assignment of reference phase positions of the intake frequency to the respective ethanol fraction of different reference fuels, based on the teachings of the present disclosure.

The determination of the composition of the presently used fuel may in this example then be performed in a straightforward manner in that, proceeding from the determined actual phase position of the intake frequency during normal operation of the internal combustion engine, in FIG. 3 at phase position 127.5, the associated point 210 on the reference curve 200 is determined, and proceeding from this in turn, the associated fuel composition, in this case ethanol fraction of 61 vol %, is determined, as visually illustrated on the basis of the dashed line in FIG. 3.

A further alternative possibility consists in providing a model function which characterizes the corresponding reference curve, and which replicates the relationship between reference phase position and the fuel composition, and thus calculating the current fuel composition with presetting of the determined actual phase position. The advantage of this alternative lies in the fact that, overall, less memory capacity has to be made available.

In some embodiments, to further increase the accuracy of the determination of the composition of the fuel used, it is possible for additional operating parameters of the internal combustion engine to be taken into consideration in the determination of the fuel composition. For this purpose, at least one of the further operating parameters:

temperature of the intake medium in the intake tract,
temperature of a coolant used for cooling the internal combustion engine and engine speed of the internal combustion engine, may be taken into consideration in the determination of the fuel composition of the fuel used.

The temperature of the intake medium, that is to say substantially of the intake air, directly influences the speed of sound in the medium and thus the pressure propagation in the inlet tract. This temperature can be measured in the intake tract and is therefore known.

The temperature of the coolant can also influence the speed of sound in the intake medium owing to heat transfer in the inlet duct and in the cylinder. This temperature is generally also monitored and, for this purpose, measured, and is thus available in any case and can be taken into consideration in the determination of the fuel composition.

The engine speed is one of the variables that characterizes the operating point of the internal combustion engine and influences the time available for the pressure propagation in the inlet duct. The engine speed is also constantly monitored and is thus available for the determination of the fuel composition.

The abovementioned additional parameters are thus available in any case or can be determined in a straightforward manner. The respective influence of the stated parameters on the phase position of the selected signal frequency of the pressure oscillation signal is in this case assumed to be known and has been determined for example during the measurement of a reference internal combustion engine and jointly stored in the reference value characteristic maps. The incorporation by means of corresponding correction factors or correction functions in the calculation of the fuel composition by means of a model function also constitutes a possibility for taking these additional, further operating parameters into consideration in the determination of the fuel composition.

In some embodiments, the determination of the actual phase position of the selected signal frequency and the determination of the composition of the presently used fuel are performed with the aid of an electronic processing unit, for example the central engine control unit (CPU), assigned to the internal combustion engine, wherein the reference value characteristic maps or the model function are/is stored in at least one memory area of the electronic processing unit. In this way, the method according to the invention can be implemented automatically, very quickly and repeatedly during the operation of the internal combustion engine.

As already indicated above, it is assumed that the reference phase positions for different fuel compositions are available for the implementation of the method. In some embodiments, the reference phase positions of the selected signal frequencies are determined in advance on a reference internal combustion engine as a function of different fuel compositions. Here, the reference internal combustion engine is an internal combustion engine of identical design to the corresponding internal combustion engine series, and in which, in particular, it is ensured that no behavior-influencing structural tolerance deviations are present. It is thereby sought to ensure that the relationship between fuel composition and phase position is determined as accurately as possible and without the influence of further disturbance factors.

The determination of corresponding reference phase positions is possible by means of the reference internal combustion engine at different operating points and with presetting or variation of further operating parameters such as the temperature of the intake medium, the coolant temperature or the engine speed. The reference value characteristic maps thus generated can then advantageously be made available in all internal combustion engines of identical design in the series, in particular stored in a memory area of an electronic processing unit assignable to the internal combustion engine.

In some embodiments, it is possible from the determined reference phase positions of the selected signal frequency and the associated fuel compositions to derive a model function which replicates at least the relationship between the reference phase positions of the selected signal frequency and the fuel compositions. Here, it is optionally also possible for the abovementioned further parameters to also be incorporated. A model function is thus generated with which, with presetting of the phase position and possible incorporation of the abovementioned variables, the respective current fuel composition can be calculated.

The model function can then may be made available in all internal combustion engines of identical design in the series, in particular stored in a memory area of an electronic processing unit assignable to the internal combustion engine. Potential advantages lie in the fact that the model function requires less memory space than comprehensive reference value characteristic maps.

In some embodiments, the determination in advance of the reference phase positions of the selected signal frequency may be performed by the measurement of a reference internal combustion engine at at least one defined operating point during intake-synchronous fuel injection, using reference fuels of different, known fuel compositions. Here, for the determination of the reference phase positions of the selected signal frequency, the dynamic pressure oscillations, assignable to a cylinder of the reference internal combustion engine, in the inlet tract are measured during operation, and a corresponding pressure oscillation signal is generated.

In some embodiments, at the same time as the measurement of the dynamic pressure oscillations, a crankshaft phase angle signal is determined. Subsequently, the reference phase position of the selected signal frequency of the measured pressure oscillations in relation to the crankshaft phase angle signal is determined from the pressure oscillation signal by means of discrete Fourier transformation. The determined reference phase angles may then stored as a function of the associated fuel compositions in reference value characteristic maps. This permits the reliable determination of the dependency between fuel composition and phase position of the selected signal frequency.

The abovementioned approach may be repeated with variation of particular influencing operating parameters, for example at different operating points, in order to broaden the database and incorporate the influences of the further parameters. This facilitates the implementation of the method during operation; in implementing the method, one is then possibly not reliant on exactly adhering to particular parameters.

In some embodiments, the intake frequency or a multiple of the intake frequency may be chosen as selected signal frequencies. In the case of these signal frequencies, the dependency of the phase position on the fuel composition is particularly pronounced.

In some embodiments, the dynamic pressure oscillations in the intake tract to be measured by means of a series-production-type pressure sensor in the intake pipe. This has the advantage that no additional pressure sensor is required, which represents a cost advantage.

In some embodiments, the crankshaft position feedback signal may be determined by means of a toothed gear and a Hall sensor, wherein this is a customary sensor arrangement, which is possibly present in the internal combustion engine in any case, for detecting the crankshaft rotations. The toothed gear is in this case arranged for example on the outer circumference of a flywheel or of the crankshaft timing adapter 10 (see also FIG. 1). This has the advantage that no additional sensor arrangement is required, which represents a cost advantage.

In some embodiments, the electronic processing unit on which the reference value characteristic maps or the model function are/is stored is an engine control unit for controlling the internal combustion engine, and an adaptation of further control variables or control routines for the control of the internal combustion engine is performed by the engine control unit as a function of the determined fuel composition. This firstly may provide the advantage that no separate electronic processing unit is required, and there are thus also no additional interfaces, which are possibly susceptible to failure, between multiple processing units.

Secondly, the method can thus be made an integral constituent part of the control routines of the internal combustion engine, whereby a fast adaptation of the control variables or control routines for the internal combustion engine to the presently used fuel is possible.

Summarized briefly once again, a method for determining the composition of the fuel used for operating an internal combustion engine may include dynamic pressure oscillations in the inlet tract of the respective internal combustion engine are measured during normal operation, and from these, a corresponding pressure oscillation signal is generated. At the same time, a crankshaft phase angle signal is determined. From the pressure oscillation signal, the actual phase position of a selected signal frequency of the measured pressure oscillations in relation to the crankshaft phase angle signal is determined, and the composition of the presently used fuel is determined on the basis of the determined actual phase position taking into consideration reference phase positions of the same signal frequency for different fuel compositions.

What is claimed is:

1. A method for operating an internal combustion engine, the method comprising:
   measuring dynamic pressure oscillations, assignable to a cylinder of the internal combustion engine, in the inlet tract of the respective internal combustion engine at a defined operating point during intake-synchronous fuel injection during normal operation;
   based at least in part on the measured oscillations, generating a corresponding pressure oscillation signal;
   determining a crankshaft phase angle signal of the internal combustion engine;
   determining an actual phase position based on the pressure oscillation signal using discrete Fourier transformation, the actual phase position of a selected signal frequency of the measured pressure oscillations determined in relation to the crankshaft phase angle signal;
   determining a chemical composition of a fuel being burnt on the basis of the determined actual phase position and reference phase positions of the same signal frequency for different fuel compositions; and
   adjusting operating parameters of the internal combustion engine based on the determined chemical composition.

2. The method as claimed in claim 1, wherein the reference phase positions as a function of the fuel composition are stored in reference value characteristic maps.

3. The method as claimed in claim 1, wherein determining the chemical composition of the fuel depends on at least one of the further operating parameters:
   temperature of the intake medium in the intake tract,
   temperature of a coolant used for cooling the internal combustion engine, and
   engine speed of the internal combustion engine.

4. The method as claimed in claim 2, wherein determining an actual phase position of the selected signal frequency and the composition of the fuel are performed by an electronic processing unit associated with the internal combustion engine; and
   the reference value characteristic maps are stored in a memory of the electronic processing unit.

5. The method as claimed in claim 1, wherein reference phase positions of the selected signal frequency have been determined in advance on a reference internal combustion engine as a function of different fuel compositions.

6. The method as claimed in claim 1, wherein the fuel composition is calculated based on a model function of reference phase positions stored in an engine controller.

7. The method as claimed in claim 5, wherein the determination in advance of the reference phase positions of the selected signal frequency includes measurement of a reference internal combustion engine at a defined operating point during intake-synchronous fuel injection, using reference fuels of different, known fuel compositions;
   wherein the determination of the reference phase positions of the selected signal frequency includes measuring the dynamic pressure oscillations assignable to a cylinder of the reference internal combustion engine in the inlet tract during operation;
   generating a corresponding pressure oscillation signal;
   determining at the same time a crankshaft phase angle signal;
   determining a reference phase position of the selected signal frequency of the measured pressure oscillations in relation to the crankshaft phase angle signal from the pressure oscillation signal by means of discrete Fourier transformation; and
   storing the determined reference phase angles as a function of the associated fuel compositions in reference value characteristic maps.

8. The method as claimed in claim 1, wherein the selected signal frequencies comprise an intake frequency or a multiple of the intake frequency.

9. The method as claimed in claim 1, wherein the dynamic pressure oscillations are measured with a series-production-type pressure sensor in the intake pipe.

10. The method as claimed in claim 1, wherein the crankshaft position feedback signal is generated by a toothed gear and a Hall sensor.

11. The method as claimed in claim 6, wherein the model function is derived from the reference phase positions of the selected signal frequency and the associated fuel compositions which replicates the relationship between the reference phase positions of the selected signal frequency and the fuel compositions.

* * * * *